US005644698A

United States Patent [19]
Cannon

[11] Patent Number: 5,644,698
[45] Date of Patent: Jul. 1, 1997

[54] CONFIGURABLE REUSE DELAY CRITERION FOR STORAGE VOLUMES

[75] Inventor: David Maxwell Cannon, Tucson, Ariz.

[73] Assignee: International Business Machines Corporation, Armonk, N.Y.

[21] Appl. No.: 655,526

[22] Filed: May 30, 1996

[51] Int. Cl.$^6$ .......................... G01R 31/28; G06F 11/00
[52] U.S. Cl. ................... 395/182.04; 395/182.13
[58] Field of Search ............ 395/182.04, 182.13, 395/182.18

[56] References Cited

U.S. PATENT DOCUMENTS

| | | | |
|---|---|---|---|
| 4,686,620 | 8/1987 | Ng | 395/610 |
| 4,878,167 | 10/1989 | Kapulka et al. | 364/200 |
| 4,945,474 | 7/1990 | Elliott et al. | 364/200 |
| 5,005,122 | 4/1991 | Griffin | 395/200.01 |
| 5,276,860 | 1/1994 | Fortier | 395/182.04 |
| 5,276,867 | 1/1994 | Kenley | 395/600 |
| 5,379,412 | 1/1995 | Eastridge et al. | 395/575 |
| 5,381,545 | 1/1995 | Baker | 395/182.17 |
| 5,390,335 | 2/1995 | Stephan | 395/800 |
| 5,513,314 | 4/1996 | Kandasamy | 395/182.04 |
| 5,537,585 | 7/1996 | Blickenstaff | 395/600 |
| 5,574,906 | 11/1996 | Morris | 395/601 |

FOREIGN PATENT DOCUMENTS

| | | | |
|---|---|---|---|
| 2907776 | 9/1980 | Germany | G06F 9/04 |
| 1248358 | 10/1989 | Japan | G11B 20/10 |

*Primary Examiner*—Robert W. Beausoliel, Jr.
*Assistant Examiner*—Glenn Snyder
*Attorney, Agent, or Firm*—R. M. Sullivan

[57] ABSTRACT

A data processing system using a storage management server provides a method and apparatus for preserving consistency between a database back-up and a set of storage volumes. The system includes a plurality of client systems coupled to the storage management server. Primary and back-up copies of client files are stored within a set of attached storage volumes. The server contains a server database to maintain directory and reference location information linking the primary and back-up copies of the client files. The server periodically performs an incremental back-up of the server database to a database back-up. The server utilizes a reuse delay criterion to set selected storage volumes as pending volumes. Pending volumes are not eligible for reuse by the server, thereby preventing the server from overwriting these pending volumes and invalidating reference location information for the pending volumes stored in the database back-up. When the reuse delay criterion elapses, the pending volumes are classified as empty, making them eligible for reuse by the server.

22 Claims, 4 Drawing Sheets

CONFIGURABLE REUSE DELAY CRITERION FOR STORAGE VOLUMES

FIELD OF THE INVENTION

The present invention relates generally to storage management within data processing systems, and more particularly, to a method and apparatus for maintaining consistency between a database back-up and a set of storage volumes within a storage management server. The storage management server stores copies of client data files on the storage volumes and records a location of the client data file in a server database. To enhance data integrity and recovery, the server periodically makes a back-up copy of the server database.

BACKGROUND OF THE INVENTION

Data processing systems typically require a large amount of data storage. Customer data, or data generated by users within the data processing system, occupies a great portion of this data storage. Effective data processing systems also provide back-up copies of this user data to prevent a loss of such data. Many businesses view any loss of data in their data processing systems as catastrophic, severely impacting the success of the business.

A storage management server provides an effective means for protecting customer data. Generally, a client-server configuration includes several clients connected to a single server. The clients create client files and transfer these files to the server. The server receives the client files and stores them on several attached storage devices. When used as a storage management system, the server manages the back-up, archival, and migration of these client files. By storing the client file on an attached storage device, the server creates a first, or primary, copy of the client file. The server may, in turn, create additional back-up copies of the client file to improve the data availability and data recovery functions of the storage management system. Clients may vary from small personal computer systems to large data processing systems having a host processor connected to several data storage devices. The server can also range from a small personal computer to a large host processor.

An advanced storage management server, such as an IBM ADSTAR Distributed Storage Manager (ADSM), maintains reference information about the client files copied within the attached storage volumes. The server uses a database to keep directory information about the original client files and storage volume location information about the copies of the client files stored within the server. The directory information typically includes a client system identifier, a client system directory, and a client file name. The location information typically consists of a storage volume identifier and an offset within the storage volume among other file attributes. In addition, the server database allows the server to assign an unique identifier to each client file stored within the attached storage volumes. Thus, the server can track individual files throughout the server storage subsystem.

Accordingly, the server database introduces several advantages to the storage management server. The server can cross-reference multiple copies of an individual client file written to different storage volumes. By cross-referencing several copies of the client file, the server improves the data availability to the client systems. For example, if a primary copy of a particular client file is inaccessible because of a destroyed volume or damaged media, the server can access an additional copy residing on a different storage volume and transfer the additional copy to the requesting client system. Further, the server can subsequently recover the unavailable primary copy of the client file from the additional copy. The server needs the storage volume location information provided by the server database to accomplish the above-described data recovery.

By tracking individual client files, the server database also allows the storage management server to perform incremental back-up operations within the server storage. Incremental back-up techniques improve the performance and efficiency of a storage management system. As contrasted to full volume copying which replicates a first, or primary, storage volume to a second, or copy, storage volume, incremental back-up copies only the newly added or updated user files from the primary storage volume to the copy storage volume. Since incremental back-up is performed periodically, the server classifies newly added or updated files as those files added or changed within a primary storage volume since a previous incremental back-up operation was completed. Incremental back-up eliminates the unnecessary copying of files that remain unchanged since the previous back-up operation. As compared to full volume copying, incremental back-up also reduces the number of partially filled copy storage volumes and the number of duplicate files stored on a copy storage volume, thereby reducing the number of copy storage volumes needed within the server.

Additionally, the storage management server can extend these advantages to provide disaster recovery. In disaster recovery systems, a back-up copy of the customer data is kept at a site remote from the primary storage location. If a disaster strikes the primary storage location, the customer data can be recovered from the back-up copies located at the remote site. As a disaster recovery system, the storage management server generates an additional back-up copy of the client file and oversees the transport of this back-up copy to a remote site. The server partitions its storage volumes into resident storage volumes located at the primary storage site and off-site storage volumes located at the remote storage site. The off-site storage volumes typically contain removable media, so that they can be transported to the remote site. The server also determines which client files need to be backed-up within the storage subsystem, how frequent these back-up copies should be made, and which set of storage volumes should be marked as off-site volumes and transported to the remote site. The server, in turn, manages the off-site storage volumes, determining which volumes are needed for disaster recovery. Off-site storage volumes no longer needed for disaster recovery can be reclaimed, returned to the primary site, and reused as resident storage volumes.

The server database improves the storage management server as a disaster recovery system. The server uses the server database to track the individual files either at the primary site or the remote site. The reference location information stored within the server database denotes whether a file copy is stored within a resident volume or an off-site volume. As described earlier, the server uses the server database to perform incremental back-up operations. The server copies newly added files from a first set of resident storage volumes to a second set of volumes and then classifies these volumes as off-site storage volumes to be transported to the remote site. As compared to full volume copying, incremental back-up reduces the number of partially filled off-site storage volumes, the number of duplicate files on the off-site storage volumes, and the number of off-site storage volumes needed.

The server database can only provide the storage management server with the aforementioned benefits if the database accurately reflects the file contents of the server storage volumes. During normal file processing, the server updates the database as each new file copy is generated within the server storage volumes. This ensures that the server database remains consistent with the attached storage volumes. However as with any of the storage volumes within the server, the server database is also susceptible to data loss. Thus, the server periodically creates a back-up of the server database to minimize the effects of a failure within the database storage. The server can then recover the database from the database back-up should a failure occur within the server database. In a disaster recovery system, the server maintains a database back-up along with recovery copies of client files at the remote site. By storing a database back-up on a set of off-site volumes, the server can recover the database should a disaster destroy the database storage at the primary site.

A database back-up, however, introduces new problems to the storage management server. When file locations change after a back-up was completed for the server database, the database back-up is no longer consistent with the storage volumes. The server database reflects the correct reference location information for the files within the server storage, but the database back-up reflects outdated reference location information for the files that moved within the server storage since the database back-up was created. Files added to the server create one type of problem for the database back-up. The database back-up lacks a record of the new file within the server and a pointer to the storage volume location of the new file.

On the other hand, moved or deleted files create a more troublesome problem for the database back-up. The database back-up points to the previous location of the moved file within the server storage. If the server subsequently overwrites the previous location of the moved file with a new file, two problems are created for the database back-up. As stated earlier, the database back-up lacks a record of this new file. If used to recover the server database, the database back-up cannot provide the server with reference location information pertaining to the new file. In addition, the database back-up also loses its reference to the moved file. The database back-up includes a record of the moved file, but instead points to the new file. If used to recover the server database, the database back-up would incorrectly provide the server access to the new file instead of the moved file. Since the database back-up contains no information about the destination of the moved file, references to both the new file and the moved file are lost in the database back-up.

For example, files a, b exist on storage volume A in the server when a back-up is created for the server database. The server then reclaims volume A by copying files a, b to storage volume B. The server updates the server database to point to volume B for the reference location information about files a, b. However, the data pertaining to files a, b is not erased from volume A when the server reclaims the volume. Thus, the database back-up still can access files a, b should the server database be recovered at this point. The server then copies new files c, d from a client system to volume A, overwriting files a, b. Again, the server updates the server database to point to volume A for the reference location information for files c, d. Now, the database back-up incorrectly points to c as reference location information for file a. If the server database were to be recovered from the database back-up at this point, files a, b, c, d would be lost.

Accordingly, an improved method and apparatus are needed in a storage management system to maintain consistency between a database back-up and a set of storage volumes. In particular, the improved method and apparatus should prevent the storage management server from overwriting previously moved or deleted files which are still referenced by the database back-up. In addition, such improved method and apparatus are needed in a disaster recovery system using a storage management server. The particular method and apparatus should maintain consistency between a database back-up at the remote site and a set of storage volumes at either the primary or remote site by preventing the server from overwriting previously moved or deleted files which are still referenced by the database back-up.

SUMMARY OF THE INVENTION

An object of the present invention is to provide an improved method in a storage management system to maintain consistency between a database back-up and a set of storage volumes. In particular, the method uses a reuse criterion to delay overwriting attached storage volumes still referenced by a database back-up. By using such reuse criterion, the method avoids invalidating references within the database back-up to moved or deleted files on the attached storage volumes.

Another object of the present invention is to provide a storage management server that maintains consistency between a database back-up and a set of attached storage volumes. In particular, the server utilizes a reuse criterion to delay overwriting attached storage volumes still referenced by a database back-up. By using such reuse criterion, the server avoids invalidating reference locations of moved or deleted files within the database back-up.

A first embodiment of the present invention includes a method within a storage management system for preserving consistency between a database back-up and a set of storage volumes. The method first specifies a reuse delay criterion for selected storage volumes. When the final file copy is moved or deleted from a selected storage volume, the method marks the selected storage volumes as a pending storage volume or empty storage volumes according to the reuse delay criterion. Storage volumes having no reuse delay criterion are marked empty, making these volumes eligible for reuse by the server. Otherwise, storage volumes with a reuse delay criterion are marked pending, thereby preventing the server from overwriting these volumes and invalidating reference location information within said database back-up. The method then periodically determines whether the reuse delay criterion has elapsed for each of the pending storage volumes. When the reuse delay criterion has elapsed, the method classifies the pending storage volume as an empty storage volume eligible for reuse by the server.

Another embodiment of the present invention includes a data processing system using a storage management server. The server is coupled to several client systems, each client system generating client files. The server includes a storage manager coupled to a server database, a database back-up, and a plurality of storage volumes. The storage manager receives client files from the client systems and stores a primary copy of the client files on a first storage volume, and generates a back-up copy of the client file on a second storage volume. The storage manager also maintains directory information about the client file, reference location information linking the primary and back-up copies of the client file, and storage volume information within the server database. The storage manager further periodically makes incremental back-ups of the server database to the database back-up. Finally, the storage manager uses a reuse criterion to delay overwriting attached storage volumes still referenced by the database back-up.

The foregoing and other objects, features, and advantages of the invention will be apparent from the following more particular description of a preferred embodiment of the invention, as illustrated in the accompanying drawings.

DETAILED DESCRIPTION OF THE INVENTION

Figure 1:
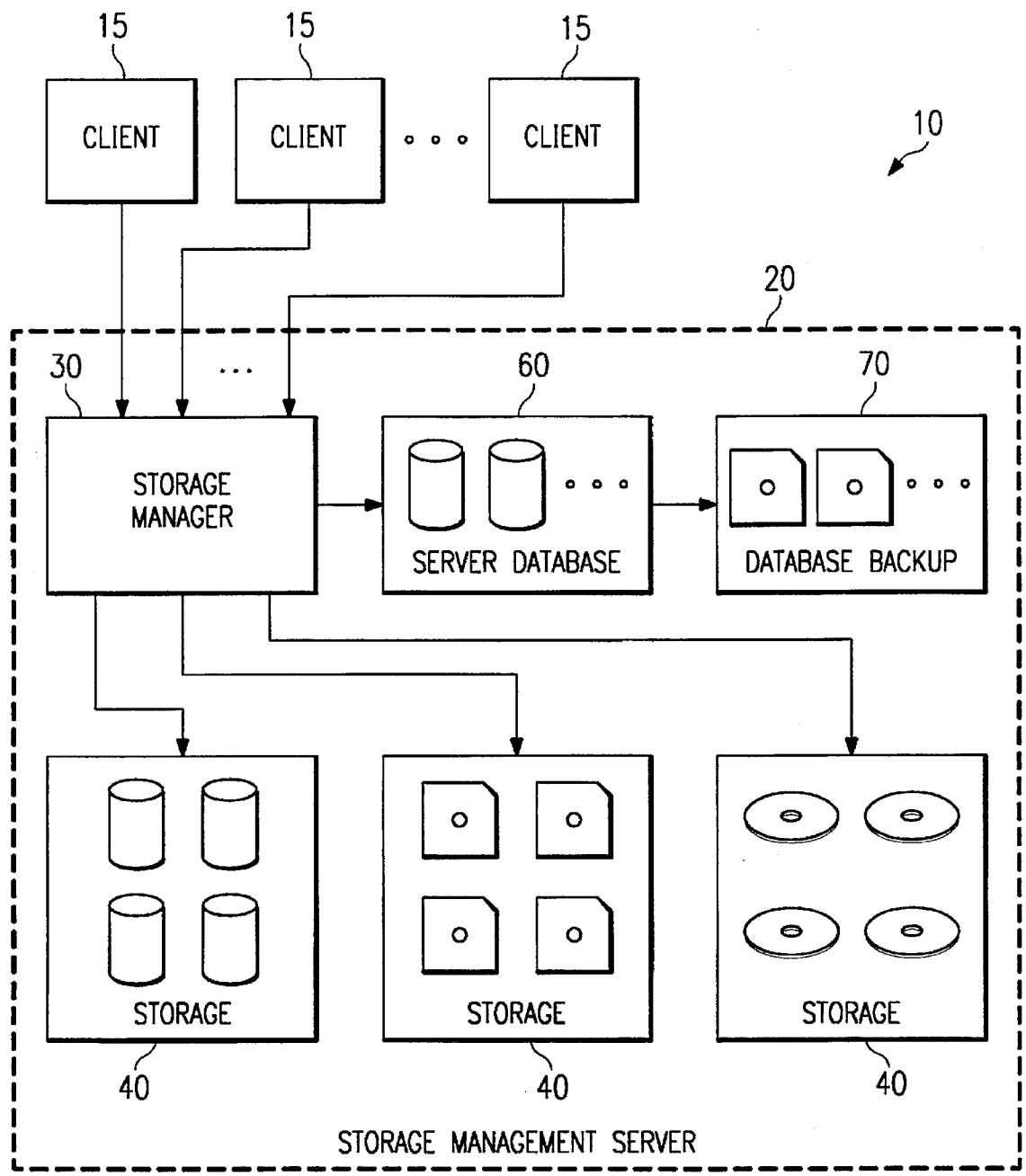
FIG. 1 is a block diagram of a data processing system showing a plurality of client systems coupled to a storage management server.

Referring more particularly to the drawing, like numerals denote like features and structural elements in the various figures. The invention will be described as embodied in a data processing system using a storage management server to manage one or more copies of client files within the attached storage volumes. Turning now to FIG. 1, a data processing system 10 is shown having multiple client systems 15 coupled to a server system 20. The server system 20 includes a storage manager 30 coupled to a server database 60. The storage manager 30 is further coupled to a plurality of storage volumes 40. The storage volumes may consist of various types of storage media, such as direct access storage devices (DASDs), optical disk, or magnetic tape. The server database 60 is further coupled to a set of storage volumes providing a database back-up 70.

Each client system 15 creates original user data files, or client files, which are stored within the corresponding client system 15. The client systems 15 transfer client files to the server system 20. Transferring client files to the server 20 inherently provides a back-up mechanism within the server 20 for these original client files. The storage manager 30 directs the client file to an attached storage volume 40. The server 20 stores a first, or primary, copy of the client file on a primary storage volume 40 and may also generate additional back-up copies of the client file on copy storage volumes 40. The storage manager 30 maintains directory information about the client file and reference location information pertaining to the copies of the client file within the server database 60.

The server database 60 allows the server 20 to monitor individual file copies within server storage subsystem 40. The server database 60 introduces advantages to the storage management server 20. The storage manager 30 can cross-reference multiple copies of an individual client file written to different storage volumes 40. If the primary copy of a client file is unavailable, the storage manager 30 can access a back-up copy from a different storage volume 40 using the reference location information in the server database 60. Moreover, the storage manager 30 can recover the primary copy of the client file from a back-up copy. In addition, the server database 60 allows the storage manager 30 to coordinate incremental back-up operations within the server 20. The server database 60 denotes which client files have been added to the server storage 40 since a previous incremental back-up operation was completed. Without the server database 60, the storage manager 30 must resort to full volume copying to provide storage volume 40 back-up.

Because of its importance to the server 20, the server database 60 is periodically saved to a set of storage volumes, called a database back-up 70. The server 20 performs an incremental back-up from the server database 60 to the database back-up 70. Thus, the storage manager 30 copies only the database entries that have been changed, or added, since a previous back-up of the server database 60. Subsequent additions to the server storage 40 are updated within the server database 60, but not the database back-up 70. Thus, the database back-up 70 lacks the references associated with additions to the server storage 40.

Figure 2:
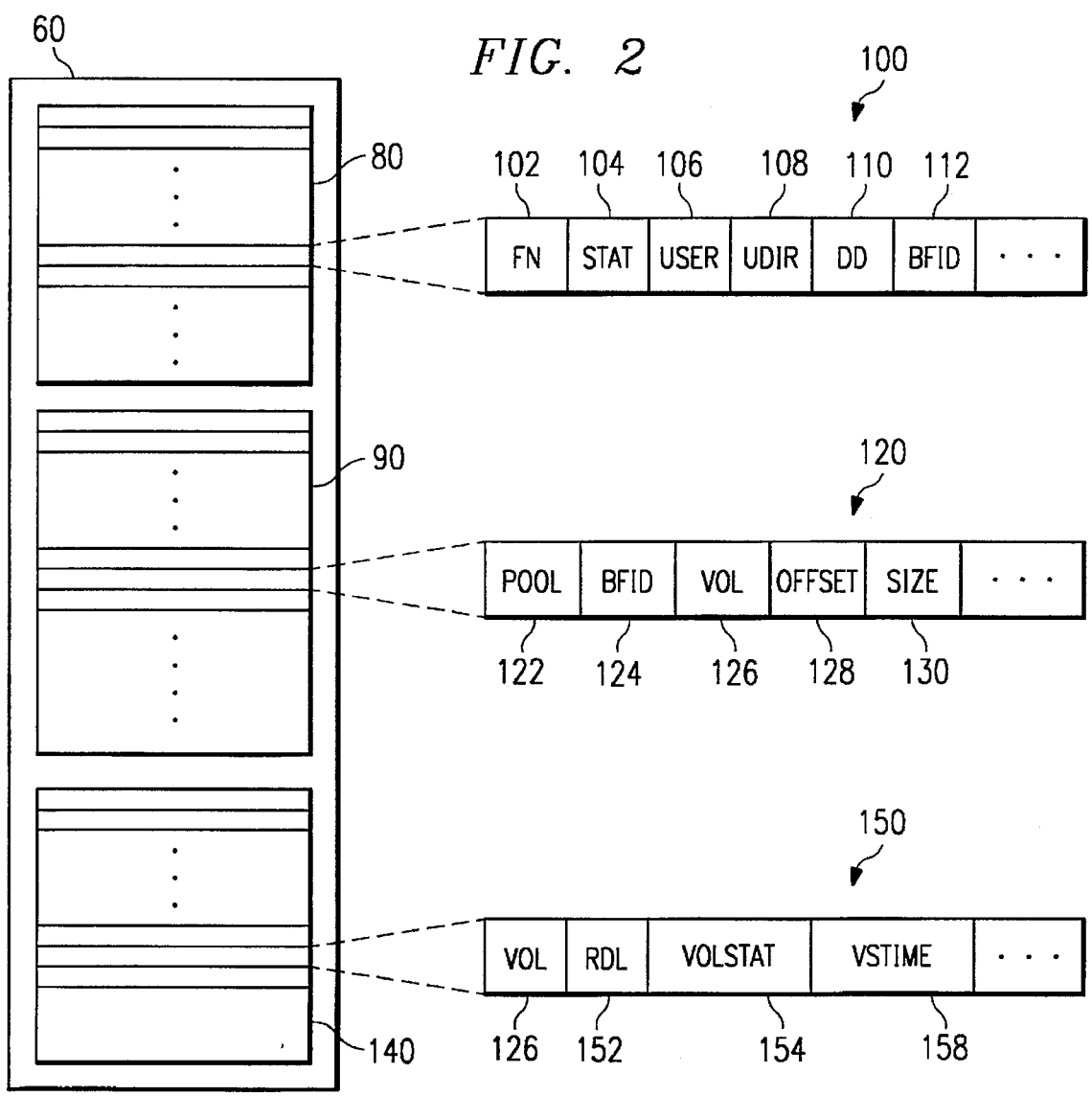
FIG. 2 is a block diagram of the database included in FIG. 1 showing directory, reference location, and storage volume information.

FIG. 2 is a block diagram showing three portions of the server database 60: a server storage inventory 80, a server storage reference list 90, and a storage volume list 140. As stated previously, the server database 60 is essential in tracking individual file copies through the server 20. The inventory 80 and reference list 90 shown in FIG. 2 provide an example of how to catalog individual file copies stored within the server storage volumes 40. An entry 100 is expanded to show a portion of the directory information contained within the server inventory 80. Likewise, one entry 120 within the reference list 90 is expanded to show a portion of the reference location information kept within this section of the server database 60. A single directory entry 100 in the server inventory 80 is only needed for each client file stored within the server 20. Whereas, a reference location entry 120 within the reference list 90 is needed for each copy of the client file stored within the server 20.

A server inventory entry 100 typically provides directory information about the client file. In FIG. 2, a first field 102 contains the file name 102 of the client file. A second field 104 maintains a status indicator 104 for the client file. A third field 106 lists the user name 106, identifying which client system 15 owns the specified client file. A fourth field 108 provides the directory name 108 within the client system 15 where the client file originated. A fifth field 110 records the date and time 110 when the client file was stored within the server 20. Finally, a sixth field 112 contains an unique identifier for the client file, denoted the bit-file identifier (bfid) 112. Each distinct client file stored in the server 20 is assigned a distinct bfid 112. Furthermore, different versions of the same client file stored within the server 20 are also assigned different bfids 112. However, back-up copies of client files created within the server 20 do not warrant distinct bfids 112, but are assigned the same bfid 112 as the corresponding client.

A reference list entry 120 typically provides reference location information about a particular copy of the client file. A server storage 40 can be organized into sets of storage volumes 40, or storage pools. A file may be located within the server storage 40 by specifying the storage pool, the storage volume within the storage pool, and the offset within the storage volume. Accordingly, a field is provided within the reference list entry for each of these parameters: a storage pool identifier 122, a storage volume identifier 126, and an offset 128 within the storage volume. An additional field 130 is provided within the reference list entry 120 to indicate the size 130 of the file. Finally, a field 124 is also provided to store the bfid 112. Thus, the bfid 112 also maps the directory information within the inventory 80 to the reference location information within the reference list 90.

The storage volume list 140 contains information relating to each of the storage volumes 40 connected within the server 20. As opposed to the inventory 80 and reference 90 lists which are organized by file copies, the storage volume list is organized by storage volumes 40. An entry 150 exists for each storage volume 40, and one is expanded to show some of the volume attributes maintained within the storage volume list 140. A first field provides a storage volume identifier 126, wherein each storage volume 40 has a distinct identifier. A second field includes a reuse delay criterion 152 pertaining to storage volume 126. The reuse delay criterion 152 specifies a delay which must be overcome before a pending storage volume 40 can be reused. A third field maintains the storage volume status 154, noting whether the storage volume is filled, filling, pending, or empty. Finally, if the volume is in a pending state, a fourth field logs information relating to the reuse delay criterion. For example, if the reuse delay criterion is measured in elapsed time, this fourth field contains the date and time 158 when the storage volume status changed to pending. Likewise, if the reuse criterion is measured in number of incremental back-ups, this fourth field would contain the current number of incremental back-ups completed.

Figure 3:
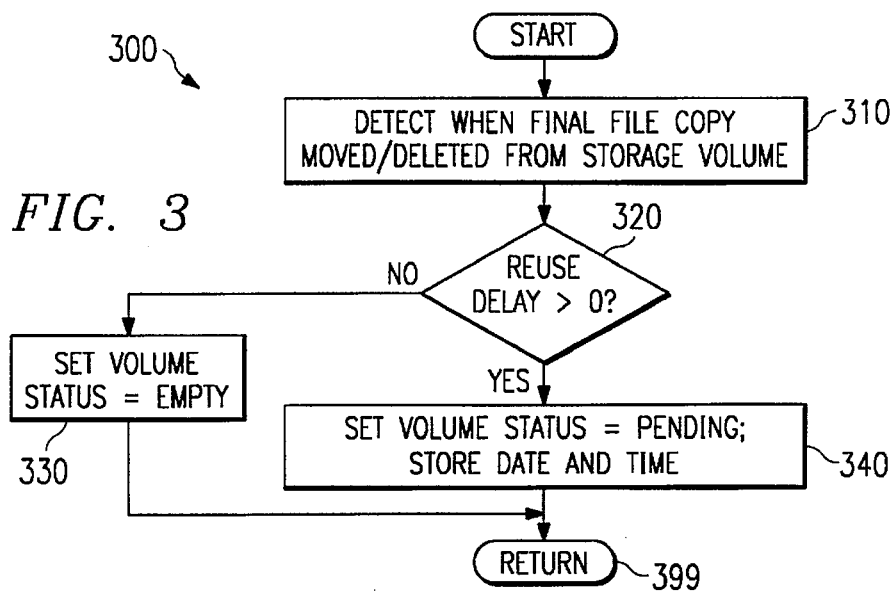
FIG. 3 shows a flow diagram of a method for the server in FIG. 1 setting a volume status for a storage volume in which the final file copy has been deleted or moved.

Referring to FIG. 3, a flow diagram describes a method 300 for updating the volume status 154 as the last remaining file copy is moved or deleted from the storage volume 40. A step 310 is provided to detect when the final file copy is moved or deleted from the storage volume 40. The storage manager 30 typically updates the server database 60 after each file operation is completed within the server 20 to reflect the current reference location information. In addition, the storage manager 30 updates the volume status 154 pertaining to a particular storage volume identifier 126 if the completed file operation warrants such a status change. At step 310, the storage manager 30 detects that the last remaining file copy has been removed from the storage volume 40.

Before updating the volume status 154, step 320 checks the reuse delay criterion 152 for the particular storage volume 40, 126. If the reuse delay criterion 152 has elapsed, step 330 sets the volume status 154 to empty for the storage volume 40, 126. Otherwise if the reuse delay criterion 152 has not elapsed, step 340 sets the volume status 154 to pending and the current criterion information is entered as the starting criterion 158. Pending status indicates that the storage volume 40 is not immediately available for reuse by the server 20. Once the reuse delay criterion 152 has been met, the server 20 can overwrite the storage volume 40, 126. Finally, step 399 signals that the volume status 154 has been appropriately set.

Figure 4:
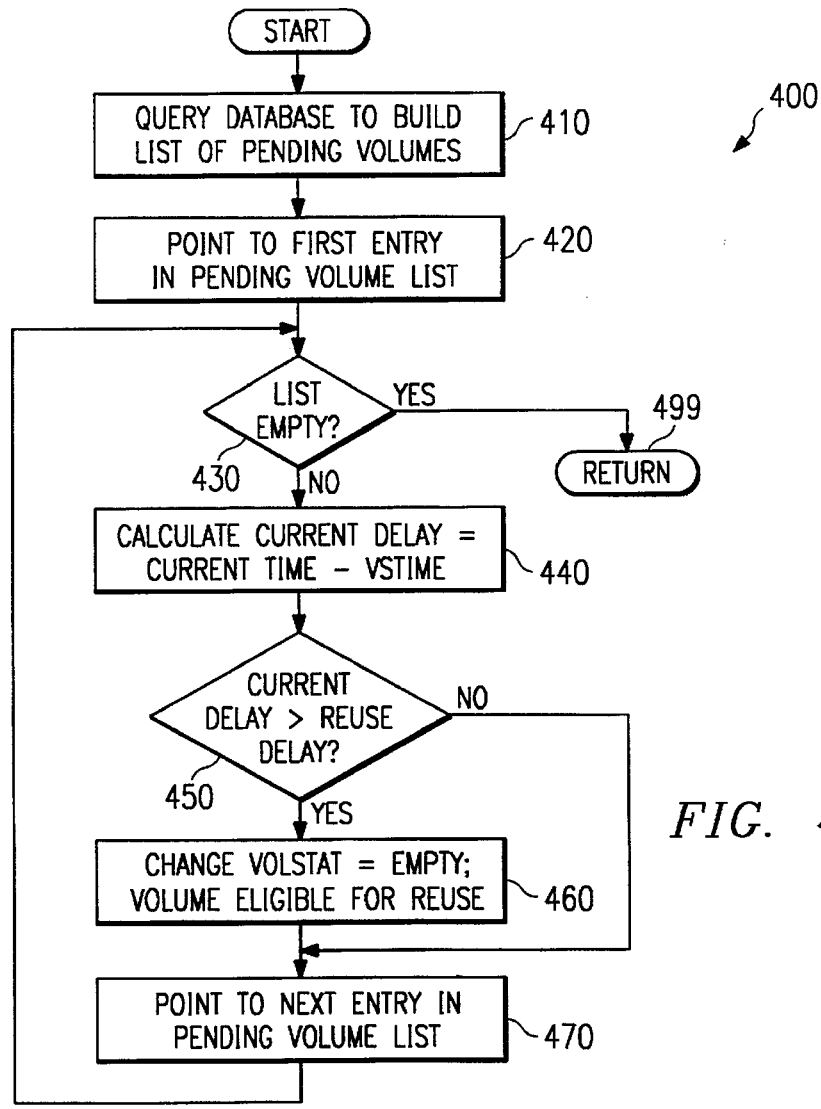
FIG. 4 contains a flow diagram of a method for the server in FIG. 1 providing a reuse delay criterion to maintain valid references within a database back-up and prevent premature overwriting of pending storage volumes.

Referring to FIG. 4, a flow diagram describes a method 400 for determining whether the reuse delay criterion 152 has elapsed for each pending storage volume 40 within the server 20. A step 410 queries the storage volume list 140 within the server database 60 to build a list of pending volumes. Each entry in the pending volume identifies a pending storage volume within the server 20 and contains the information from the storage volume list 140 pertaining to the pending volume. A step 420 points to the first entry in the pending volume list. At step 430, the pending volume list is checked to determine if the end of the list has been reached. If so, step 499 indicates the completion of the check of all pending volumes within the server 20. Otherwise, a step 440 calculates the current delay which has elapsed for the current pending volume. For example, if the reuse delay criterion for the pending volume is specified in time, the current delay would be calculated by subtracting the time stamp 158 when the volume initially entered the pending state from the current date and time. Likewise, if the reuse delay criterion were specified in number of back-ups, the current delay would be the difference between the current number of back-ups and the number of back-ups stored in the starting criterion 158.

A step 450 compares the current delay criterion with the reuse delay criterion 152. If the current delay exceeds the reuse delay criterion 152, the storage volume 40, 126 can now be reused by the server 20. A step 460 changes the volume status 154 for the current pending volume from pending to empty, thereby marking the current storage volume 40, 126 as eligible for reuse. If the current delay does not exceed the reuse delay criterion 152, the current storage volume 40, 126 must remain in the pending state and the volume status 154 remains unchanged. A step 470 points to the next entry within the pending volume list and continues to step 430 to check whether the end of the pending volume list has been reached.

The server 20 shown in FIG. 1 executes the method steps described in FIGS. 3 and 4 using a control program. A control program is a sequence of control instructions grouped to carry out any number of tasks. For the server 20 described in FIG. 1, the storage manager 30 contains a control program for managing the varied tasks of the server 20. Accordingly, the storage manager 30 executes the method steps described in FIGS. 3 and 4 for insuring that a reuse criterion 152 is met before a particular storage volume 40, 126 is eligible to be reused by the server 20. The reuse delay criterion 152 prevents the server 20 from overwriting moved or deleted files on the storage volume 40, 126 that are still referenced by the database back-up 70. Delaying storage volume reuse maintains consistency between the database back-up 70 and a set of storage volumes 40 within the server 20.

Figure 5:
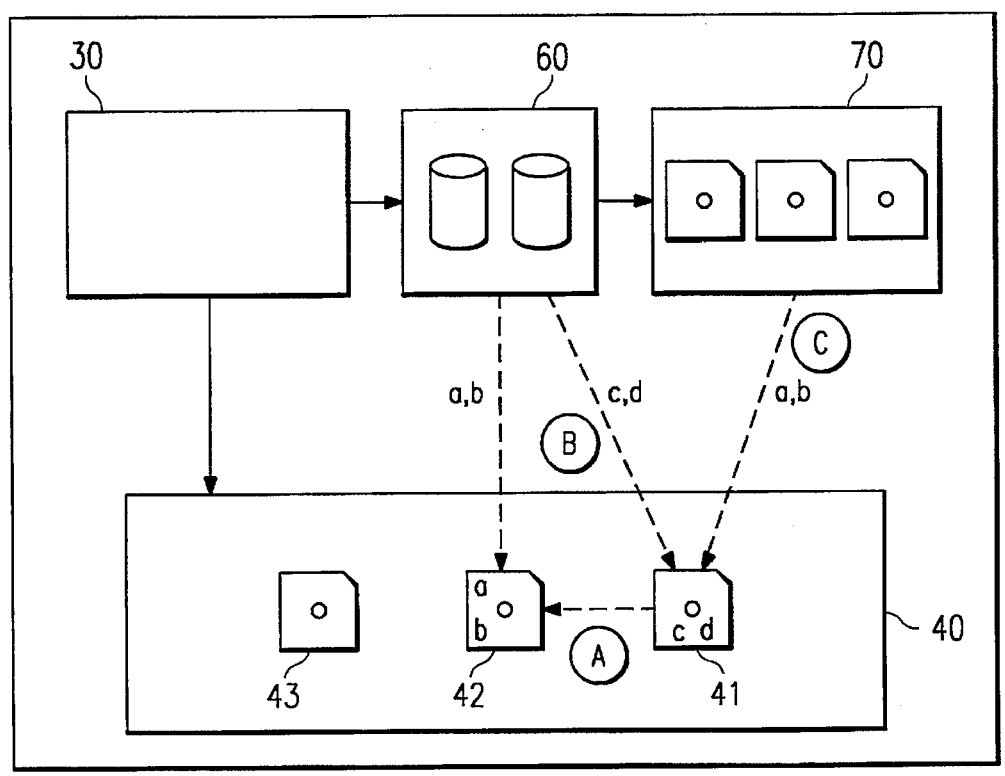
FIG. 5 is a block diagram of the storage management server in FIG. 1 showing the problem where overwriting a reclaimed storage volume invalidates references within a database back-up.

FIG. 5 provides an example of the problem encountered when reuse delay criterion 152 is not used within the storage management server 20 of FIG. 1. A block diagram shows the server 20 comprising a storage manager 30 coupled to a server database 60, a database back-up 70, and a set 40 of storage volumes 41–43. Three events A, B, C occur within the server 20, to bring about the overwrite problem. First, in event A, the server 20 reclaims a first storage volume 41 by moving files a, b to a second storage volume 42. Files a, b are copied to the second storage volume 42, but the previous copies of files a, b also remain on the first storage volume 41. The storage manager 30 updates the server database 60 to point to the second storage volume 42 for files a, b. Thus, files a,b are moved in the sense that the reference location information in the server database 60 reflects their new position on the second storage volume 42.

The database back-up 70, however, still maintains references for files a, b on the first storage volume. Since the data for files a, b still remains on the first storage volume 41, the database back-up 70 maintains valid references to files a, b.

In event B, the server 20 transfers new files c, d to the first storage volume 41, thereby overwriting files a, b. The storage manager 30 allows files c, d to be written to the first storage volume 41 because it classified the volume 41 as empty when it reclaimed the volume 41 in event A. An empty volume status typically allows the server 20 to reuse the storage volume 41. The storage manager 30 updates the reference location information for files c, d in the server database 60 to reflect their position on the first storage volume 41. However, the references for files a, b in the database back-up 70 have now been invalidated, since the data for files a, b has been overwritten.

Event C indicates that the database back-up 70 maintains invalid references to files a, b on the first storage volume 41. The server database 60 is periodically saved to the database back-up 70. Event C also reflects the scenario where the server database 60 has not been backed-up to the database back-up 70 to correct the invalid references. If the server 20 needs to recover the server database 60 from the database back-up 70 before the next periodic back-up, files a, b, are lost since the server 20 has overwritten them with files c, d on the first storage volume 41. Thus, the server 20 can avoid invalidating the references to files a, b in the database back-up 70 by using a reuse delay criterion.

Figure 6:
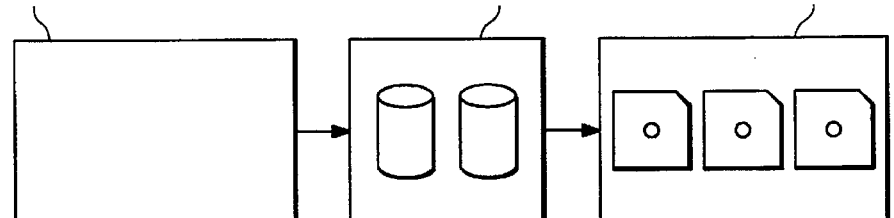
FIG. 6 is a block diagram of the storage management server in FIG. 1 showing a scenario where using a reuse delay criterion prevents overwriting a reclaimed storage volume, thereby maintaining valid references within a database back-up.

FIG. 6 illustrates how the storage management server 20 of FIG. 1 can avoid the problem encountered in the example of FIG. 5 by using a reuse delay criterion 152. Again, a block diagram shows the server 20 comprising a storage manager 30 coupled to a server database 60, a database back-up 70, and a set 40 of storage volumes 41–43. As in the example of FIG. 5, three events A, B, C occur within the server 20. First, in event A, the server 20 reclaims a first storage volume 41 by moving files a, b to a second storage volume 42. Files a, b are copied to the second storage volume 42, but the previous copies of files a, b also remain on the first storage volume 41. The storage manager 30 updates the server database 60 to point to the second storage volume 42 for files a, b. Thus, files a,b are moved in the sense that the reference location information in the server database 60 reflects their new position on the second storage volume 42.

Because the last remaining file copy has been removed from the first storage volume 41, the storage manager 30 checks the storage volume information 140 in the server database 60 to determine whether the first storage volume 41 has a reuse delay criterion 152. In this case, the first storage volume 41 includes a reuse delay 152 and the storage manager 30 marks the volume status 154 as pending. The first storage volume 41 remains in pending status 154 until the reuse delay criterion 152 has expired. In event B, the server 20 transfers new files c, d to the server storage 40. The first storage volume 41 remains pending since its reuse criterion has not been met. In pending status 154, the first storage volume is not eligible for reuse. Thus, the storage manager 30 copies files c, d to a third storage volume 43. Since the data for files a, b still remains on the first storage volume 41, the database back-up 70 maintains valid references to files a, b. The storage manager 30 updates the reference location information for files c, d in the server database 60 to reflect their position on the third storage volume 43.

Event C indicates that the database back-up 70 maintains valid references to files a, b on the first storage volume 41. Additionally, the server database 60 maintains references to files a, b in their new position on the second storage volume 42, and to files c, d stored on the third storage volume 43. Again, the server database 60 is periodically saved to the database back-up 70. If the server 20 needs to recover the server database 60 from the database back-up 70 before the next periodic back-up, files a, b, are not lost since the server 20 wrote files c, d to the third storage volume 43, instead of overwriting files a, b on the first storage volume 41. Thus, the server 20 avoids invalidating the references to files a, b in the database back-up 70 by using a reuse delay criterion.

Figure 7:
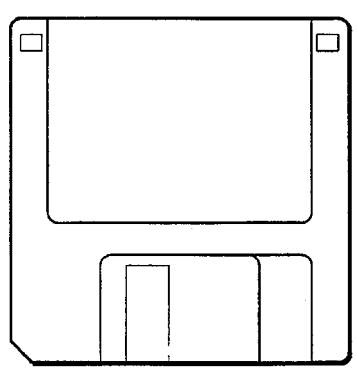
FIG. 7 is a block diagram representing a storage medium or memory for storing computer executable instructions.

FIG. 7 depicts a storage medium 700 for storing executable computer instructions, such as a magnetic diskette, an optical disk cartridge, or a magnetic tape cartridge. This figure also represents memories used to store executable computer instructions, such as read-only memory (ROM) or programmable memory (PROM). The requirement for these storage mediums or memories is that they store digital representations of computer executable instructions.

While the invention has been particularly shown and described with reference to preferred embodiments thereof, it will be understood by those skilled in the art that various changes in form and details may be made therein without departing from the spirit and scope of the invention. For example, the client systems and the server system have been shown in the figures as separate hardware systems. However, within the scope of the present invention, the client systems and the server system could be separate software applications running under the same data processing system.

In addition, storage volumes used in the database back-up are not meant to be limited to magnetic tape, but may comprise other sequential storage media, such as sequential DASD or optical disk. Likewise, storage volumes in the server storage and the server database may also comprise any sequential storage media, and are not limited to the types of media represented in the figures.

Finally, the storage management server could be used to provide disaster recovery. In such a configuration, the server uses a reuse delay criterion to preserve consistency between a database back-up at a remote site and a set of storage volumes at a primary site. A consistent database back-up also protects the storage volumes at the remote site.

What is claimed is:

1. In a data processing system having a plurality of client systems generating client data files, and a storage management server coupled to said plurality of client systems, said server having a plurality of storage volumes for storing a primary copy and a back-up copy of said client data files, a server database for maintaining directory and reference location information linking said primary copy and said back-up copy of said client data files, and a database back-up for storing an incremental back-up of said server database, a method in said server for preserving consistency between said database back-up and said plurality of storage volumes comprising steps of:

(a) maintaining storage volume information in said server database, an entry in said storage volume information corresponding to each of said plurality of storage volumes;

(b) specifying a reuse delay criterion for a selected storage volume;

(c) marking said selected storage volume as a pending storage volume when a last remaining file is removed from said selected storage volume to prevent said server from invalidating references within said database back-up by overwriting said selected storage volume;

(d) periodically checking whether said reuse delay criterion has elapsed for said pending storage volume; and (e) classifying said pending storage volume as eligible for reuse by said server when said reuse delay criterion has elapsed.

2. The method of claim 1 further comprising:

(f) marking said selected storage volume as an empty storage volume when said reuse delay criterion is not specified for said selected storage volume.

3. The method of claim 2 wherein the step (b) further comprises setting a reuse delay field in said storage volume information entry corresponding to said selected storage volume.

4. The method of claim 3 wherein the step (c) further comprises:

setting a volume status field to a pending status in said storage volume information entry corresponding to said selected storage volume; and indicating when said selected volume was initially set pending in a starting criterion field in said storage volume information entry corresponding to said selected storage volume.

5. The method of claim 4 wherein the step (d) further comprises:

calculating a current delay criterion for said pending storage volume, said current delay criterion being the difference between a current criterion and said starting criterion; and comparing said current delay criterion with said reuse delay criterion corresponding to said pending storage volume.

6. The method of claim 5 wherein the step (e) further comprises:

setting said volume status field to an empty status in said storage volume information entry corresponding to said pending storage volume; and clearing said starting criterion field in said storage volume information entry corresponding to said selected storage volume.

7. The method of claim 6 wherein the step (f) further comprises setting said volume status field to said empty status in said storage volume information entry corresponding to said selected storage volume.

8. The method of claim 7 wherein said reuse delay criterion comprises an amount of elapsed time from when said last remaining file is removed from said selected storage volume until said server can reuse said selected storage volume.

9. The method of claim 8 wherein said reuse delay criterion comprises a number of incremental back-ups to occur before said server can reuse said selected storage volume.

10. The method of claim 9 wherein said reuse delay criterion comprises a command to be issued to said server before said server can reuse said selected storage volume.

11. In a data processing system having a plurality of client systems generating client data files, and a storage management server coupled to said plurality of client systems, said server having a plurality of storage volumes for storing a primary copy and a back-up copy of said client data files, said server comprising:

a server database for maintaining directory and reference location information linking said primary copy and said back-up copy of said client data files, said server also maintaining a storage volume list having an information entry which includes a reuse delay criterion, corresponding to each of said plurality of storage volumes;

a database back-up for storing an incremental back-up of said server database, said database back-up also maintaining directory, reference location, and storage volume information pertaining to said storage volumes; and a storage manager coupled to said plurality of storage volumes, said server database, and said database back-up, said storage manager storing said primary and said back-up copy of said client data files in said plurality of storage volumes, said storage manager also periodically performing an incremental back-up operation from said server database to said database back-up, said storage manager further preserving consistency between said database back-up and said plurality of storage volumes by marking a selected storage volume as a pending storage volume when a last remaining copy of said client data files is removed from said selected storage volume, thereby preventing said server from invalidating reference location within said database back-up by overwriting said selected storage volume.

12. The server in claim 11 further comprising:

a volume status field within said information entry in said storage volume list; and a starting criterion within said information entry in said storage volume list.

13. The server in claim 12 wherein said storage manager sets said volume status according to said reuse delay criterion corresponding to said selected storage volume.

14. The server in claim 13 wherein said storage manager sets a pending status in said volume status field corresponding to said selected storage volume having said reuse delay criterion, said pending status indicating said selected storage volume is a pending storage volume, not eligible for reuse by said server.

15. The server in claim 14 further comprising:

a first list in said server database identifying said pending storage volumes, wherein said storage manager queries said storage volume list to build said first list.

16. The server in claim 15 wherein, for each said pending storage volume, said storage manager periodically determines whether said reuse delay criterion have elapsed.

17. The server in claim 15 wherein said storage manager sets an empty status in said volume status field corresponding to said selected storage volume not having said reuse delay criterion, said empty status indicating said selected storage volume is eligible for reuse by said server.

18. The server in claim 17 wherein said storage manager sets said empty status in said volume status field corresponding to said pending storage volume once said reuse delay criterion has elapsed, indicating said pending storage volume is now eligible for reuse by said server.

19. The server in claim 18 wherein said reuse delay criterion comprises an amount of elapsed time from when said last remaining copy is moved or deleted from said selected storage volume until said server can reuse said selected storage volume.

20. The server in claim 18 wherein said reuse delay criterion comprises a number of incremental back-ups to occur before said server can reuse said selected storage volume.

21. The server in claim 20 wherein said reuse delay criterion comprises a command to be issued to said server before said server can reuse said selected storage volume.

22. In a data processing system having a plurality of client systems generating client data files, and a storage management server coupled to said plurality of client systems, said server having a plurality of storage volumes for storing a primary copy and a back-up copy of said client data files, a server database for maintaining directory and reference location information linking said primary copy and said back-up copy of said client data files, and a database back-up for storing an incremental back-up of said server database, a program product having executable computer instructions for preserving consistency between said database back-up and said plurality of storage volumes comprising:

- a computer readable storage medium for storing said executable computer instructions, said executable computer instructions comprising:

maintaining storage volume information in said server database, an entry in said storage volume information corresponding to each of said plurality of storage volumes;

specifying a reuse delay criterion for a selected storage volume;

marking said selected storage volume as a pending storage volume when a last remaining file is removed from said selected storage volume to prevent said server from invalidating references within said database back-up by overwriting said selected storage volume;

periodically checking whether said reuse delay criterion has elapsed for said pending storage volume;

classifying said pending storage volume as eligible for reuse by said server when said reuse delay criterion has elapsed; and marking said selected storage volume as an empty storage volume when said reuse delay criterion is not specified for said selected storage volume.

* * * * *